(12) United States Patent
Kustrowski et al.

(10) Patent No.: US 9,302,252 B2
(45) Date of Patent: Apr. 5, 2016

(54) METHOD OF SYNTHESIS OF CMK-3-TYPE CARBON REPLICA

(71) Applicant: UNIWERSYTET JAGIELLONSKI, Cracow (PL)

(72) Inventors: Piotr Kustrowski, Cracow (PL); Rafal Janus, Ptaszkowa (PL); Paula Niebrzydowska, Legnica (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 0 days.

(21) Appl. No.: 14/374,566

(22) PCT Filed: Feb. 8, 2013

(86) PCT No.: PCT/PL2013/000015
§ 371 (c)(1),
(2) Date: Jul. 25, 2014

(87) PCT Pub. No.: WO2013/122488
PCT Pub. Date: Aug. 22, 2013

(65) Prior Publication Data
US 2015/0010459 A1     Jan. 8, 2015

(30) Foreign Application Priority Data

Feb. 14, 2012 (PL) ........................ 398111

(51) Int. Cl.
| | |
|---|---|
| *C01B 31/02* | (2006.01) |
| *B01J 29/03* | (2006.01) |
| *C01B 31/00* | (2006.01) |
| *B01J 37/03* | (2006.01) |
| *B01J 37/06* | (2006.01) |
| *B01J 37/08* | (2006.01) |
| *B01J 21/18* | (2006.01) |
| *B01J 35/00* | (2006.01) |
| *B01J 35/10* | (2006.01) |
| *B01J 37/00* | (2006.01) |
| *C01B 37/00* | (2006.01) |
| *B01J 20/20* | (2006.01) |
| *B01J 20/30* | (2006.01) |
| *B01J 20/28* | (2006.01) |

(52) U.S. Cl.
CPC ............. *B01J 29/0308* (2013.01); *B01J 20/20* (2013.01); *B01J 20/28083* (2013.01); *B01J 20/3057* (2013.01); *B01J 20/3078* (2013.01); *B01J 20/3085* (2013.01); *B01J 21/18* (2013.01); *B01J 35/002* (2013.01); *B01J 35/1023* (2013.01); *B01J 35/1028* (2013.01); *B01J 37/0018* (2013.01); *B01J 37/031* (2013.01); *B01J 37/06* (2013.01); *B01J 37/084* (2013.01); *C01B 31/00* (2013.01); *C01B 31/02* (2013.01); *C01B 37/00* (2013.01); *C01P 2006/17* (2013.01)

(58) Field of Classification Search
CPC ............................ C01B 31/02; C01P 2006/17
See application file for complete search history.

(56) References Cited

U.S. PATENT DOCUMENTS

2002/0187896 A1    12/2002 Ryoo et al.

OTHER PUBLICATIONS

Smith M A et al., "The local and surface structure of ordered mesoporous carbons from nitrogen sorption, NEXAFS and synchrotron radiation studies", Microporous and Mesoporous Materials, Elsevier Science Publishing, New York, US, vol. 92, No. 1-3, Jun. 20, 2006, pp. 81-93, XP028039011, ISSN: 1387-1811, DOI: 10.1016/J.MICROMESO.2005.09.006 [retrieved on Jun. 20, 2006].
In-Soo Park et al., "Synthesis of magnetically separable ordered mesoporous carbons using furfuryl alcohol and cobalt nitrate in a silica template", Journal of Materials Chemistry, vol. 16, No. 33, Jul. 18, 2006, p. 3409, XP055064909, ISSN: 0959-9428, DOI: 10.1039/b604228g.
Kim Tae-Wan et al., "A synthetic route to ordered mesoporous carbon materials with graphitic pore walls", Angewandte Chemie. International Edition, Wiley VCH Verlag, Weinheim, vol. 42, No. 36, Sep. 22, 2003, pp. 4375-4379, XP002418215, ISSN: 1433-7851, DOI: 10.1002/ANIE.200352224.
Dong X et al., "A structure of MnO2 embedded in CMK-3 framework developed by a redox method", Microporous and Mesoporous Materials, Elsevier Science Publishing, New York, US, vol. 91, No. 1-3, Apr. 15, 2006, pp. 120-127, XP028038871, ISSN: 1387-1811, DOI: 10.1016/J.MICROMESO.2005.11.019 [retrieved on Apr. 15, 2006].
Weihua Shen et al., "A facile way to synthesize ordered mesoporous carbon replicated by mesoporous silicas", Diffusion and Defect Data. Part B: Solid State Phenomena; China International Conference on Nanoscience and Technology, Scitec Publications Ltd, CH; Beijing, China, vol. 121-123, No. Part1, Mar. 2007, pp. 69-73, XP008162648, ISSN: 1012-0394 ISBN: 978-3-908451-30-3.
International Search Report for App. No. PCT/PL2013/000015 filed Feb. 8, 2013.

*Primary Examiner* — Stuart Hendrickson
(74) *Attorney, Agent, or Firm* — Walker & Jocke

(57) ABSTRACT

The method of obtaining the CMK-3-type carbon replica, consisting of the introduction of SBA-15-type molecular sieve to a mixture of furfuryl alcohol and a solvent, the subsequent polycondensation of furfuryl alcohol, carbonization of the prepared, composite and removal of the hard template, according to the invention, is characterized in that the reaction of furfuryl alcohol polycondensation is carried out by the precipitation method in a slurry containing SBA-15 silica sieve, water, furfuryl alcohol and concentrated solution of hydrochloric acid in mass ratios, respectively, in the range from 1.00:32.33:1.00:6.65 to 1.00:30.83:2.50:16.64, whereas the ratio of the total mass of furfuryl alcohol and water to the mass of SBA-15 as well as the mass ratio of the concentrated HCl solution to the mass of furfuryl alcohol are kept at the constant value every time.

11 Claims, 1 Drawing Sheet

METHOD OF SYNTHESIS OF CMK-3-TYPE CARBON REPLICA

Figure 1:
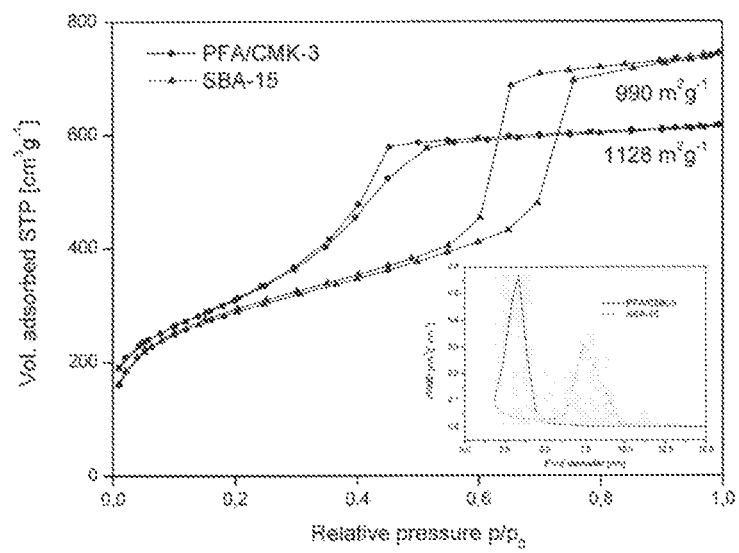

The subject of the invention is the method of synthesis of CMK-3-type carbon replica. The carbon replica obtained by this method is especially destined for catalytic applications.

In recent years, various routes of synthesis of CMK-n-type carbon replicas have been intensively developed. The main goal of this research was to obtain carbon materials with surface properties typical of the commercially used activated carbons, but exhibiting highly ordered intraparticle porosity as well. The CMK-n-type carbon replicas, which have been developed, show the presence of mesopores avoiding diffusion limitations, characteristic for commercial, microporous activated carbons. The mesoporosity, highly expanded specific surface area and well-ordered porous microstructure of carbon replicas allow exposing a large number of surface sites, active in absorption and catalytic processes, as has been strongly supported by promising results of application experiments published in the literature. The significant advantage of the carbon replicas compared to the commercial activated carbons is the possibility of precise control of the structure of synthesized material by suitably chosen conditions of synthesis and subsequent thermal treatment. Therefore, the extensive studies on the optimization of conditions of carbon replica synthesis have been performed. These investigations have been mainly focused on the simplification and shortening of the synthesis. However, all developed methods are multi-stage and involve using expensive and harmful reagents and solvents. These disadvantages make impossible the industrial implementation of these methods.

The pioneer method of the synthesis of CMK-3-type carbon replica proposed by Ryoo et al. [R. Ryoo, S. H. Joo, S. Jun, *J Phys Chem B*, 37 (1999) 7743-7746; S. Jun, S. H. Joo, R. Ryoo, M. Kruk, M. Jaroniec, Z. Liu, T. Ohsuna, O. Terasaki, *J Am Chem Soc*, 122 (2000) 10712-10713] included the double wetness impregnation of SBA-15 (mesoporous silica with a hexagonally ordered porous structure) with an aqueous solution of sucrose, subsequent carbonization and finally removal of the hard template ($SiO_2$) by treatment with a HF or NaOH solution. Over the years, the development of new types of carbon replicas resulted in using various carbon sources, to example: acenaphtene, antracene, naphthalene, hexane, acrylonitrile, furfuryl alcohol [Y. Zhai, Y. Wan, Y. Cheng, Y. Shi, F. Zhang, B. Tu, D. Zhao, *J Porous Mater*, 15 (2008) 601-611, H. Müller, P. Rehak, C. Jäger, J. Hartmann, N. Meyer, S. Spange, *Adv Mater*, 22 (2000) 1671-1675].

The application of aforementioned carbon sources required using appropriate methods of deposition of polymeric species inside the pore system of hard template. The silica support was often pre-modified with a polymerization or polycondensation catalyst, but this additional step prolonged the overall synthesis process. In the case of using furfuryl alcohol, which appeared to be the carbon precursor providing the exceptional stability of CMK-3 replicas, the synthesis methods reported earlier were based on the introduction of the monomer into the pore system of SBA-15 matrix pre-treated with a compound forming surface acidic centers, e.g. oxalic acid or $AlCl_3$. The formed center played a role of catalytic sites in the next step of the synthesis, namely the polycondensation of furfuryl alcohol. Typically, SBA-15 was impregnated with a solution of furfuryl alcohol in an organic solvent, while the next operations in the synthesis of replica included carbonization of the carbon precursor in inert atmosphere and leaching the silica template with hydrofluoric acid or alkali solution [A. Sayari, Y. Yang, *Chem Mater*, 17 (2005) 6108-6113; A-H. Lu, W-C. Li, W. Schmidt, F. Schüth, *Microporous Mesoporous Mater*, 80 (2005) 117-128; Y. Li, Y. Chen, L. Li, J. Gu, W. Zhao, L. Li, J. Shi, *Appl Catal A*, 366 (2009) 57-64; A-H. Lu, W-C. Li, W. Schmidt, F. Schüth, *Microporous Mesoporous Mater*, 95 (2006) 187-192; US2002187896]. The introduction of certain carbon sources on the template surface required the use of advanced and complicated chemical vapour deposition (CVD) technique combined with autoclaving. Moreover, some of the proposed methods involved the application of noxious, organic solvents, such as toluene [T. Yokoi, S. Seo, N. Chino, A. Shimojima, T. Okubo, *Microporous Mesoporous Mater*, 124 (2009) 123-130; M. Sevilla, A. B. Fuertes, *J Coll Interf Sci*, 366 (2012) 147154].

The aim of the presented invention was to develop a simplified method for preparing the CMK-3-type carbon replica using furfuryl alcohol as the carbon precursor.

The method of obtaining the CMK-3-type carbon replica, consisting of the introduction of SBA-15-type molecular sieve to a mixture of furfuryl alcohol and a solvent, the subsequent polycondensation of furfuryl alcohol, carbonization of the prepared composite and removal of the hard template, according to the invention, is characterized in that the reaction of furfuryl alcohol polycondensation is carried out by the precipitation method in a slurry containing SBA-15 silica sieve, water, furfuryl alcohol and concentrated solution of hydrochloric acid in mass ratios, respectively, in the range from 1.00:32.33:1.00:6.65 to 1.00:30.83:2.50:16.64, whereas the ratio of the total mass of furfuryl alcohol and water to the mass of SBA-15 as well as the mass ratio of the concentrated HCl solution to the mass of furfuryl alcohol are kept at the constant value every time.

The polycondensation reaction is preferably performed at a temperature from the range of 30-100° C. and for a time not less than 1 hour.

The presented invention significantly simplifies the method of introduction of poly(furfuryl alcohol) into the channel system of silica sieve. Instead of the complicated procedure of modification of SBA-15 surface in order to form acidic sites followed by subsequent polycondensation, the one-step deposition process of poly(furfuryl alcohol) by the precipitation polycondensation performed in an aqueous slurry of hard template is proposed. The synthesis is carried out in an environmentally friendly water solvent, reducing additionally the energy consumption of overall process by omitting the thermal operations required during the typical surface modification of SBA-15. The process is therefore less energy- and time-consuming. The method of precipitation polycondensation of furfuryl alcohol in aqueous slurry of SBA-15 catalyze by hydrochloric acid, proposed according to the invention, provides a homogenous distribution of the introduced polythene material in the whole pore system of hard silica template. Thus, the resulting carbon replica exhibits a low content of amorphous phases and a well-defined pore size distribution. Using poly(furfuryl alcohol) as the carbon precursor results in obtaining of the carbon replica characterized by a high content of oxygen-containing surface moieties.

The mesoporous CMK-3 carbon sieves, prepared according to presented invention, show promising potential of application in catalysis (e.g. the oxidative dehydrogenation of ethylbenzene to styrene), adsorption and electrochemistry.

The method according to the invention can be better demonstrated in the examples of application.

EXAMPLE 1

Synthesis of SBA-15 Hard Template

A mixture of 60.00 mL of distilled water, 120.00 g of 2 M HCl and 8.00 g of Pluronic P123 surfactant is introduced into a two-necked round bottom flask (250 mL) placed in an oil bath and equipped with a reflux condenser, a magnetic stirrer and a thermometer. The mixture is stirred (1000 rpm) at 35° C. until the surfactant is dissolved. Then, to the obtained homogenous mixture an amount of 18.20 mL of tetraethyl orthosilicate (TEOS, 98%), previously cooled in a fridge, is added dropwise (3 drops/sec) from a burette. The resulting suspension is stirred (400 rpm) at 35° C. for further 20 h. Afterwards, the flask is closed with stoppers and transferred to a dryer for next 24 h at 90° C. The formed precipitate is isolated using a Büchner funnel, washed with a large amount of distilled water and dried at room temperature. In order to remove the soft organic template, the dried material is calcined in a muffle oven at 550° C. in air atmosphere at a heating rate of 1° C./min and an isothermal period of 8 h.

Synthesis of PFA/SBA-15 Composite

In a two-necked round bottom flask (250 mL) placed in an oil bath and equipped with a reflux condenser, a magnetic stirrer and thermometer, a mixture of 94.00 mL of distilled water and 6.00 g (5.29 mL) of furfuryl alcohol is prepared. Then, an amount of 3.00 g of SBA-15 silica, previously dried at 150° C. for 24 h, is added. The obtained slurry is stirred (400 rpm) at room temperature for 30 min. Subsequently, 34.10 mL of concentrated HCl (about 35% by weight) is introduced and the temperature of the oil bath is increased to 100° C. The reaction of polycondensation of furfuryl alcohol is maintained for 6 h since the slurry reaches the desired temperature. The resulting brown PFA/SBA-15 precipitate is isolated using a Büchner funnel, washed with a large amount of distilled water and dried at 40° C. for 24 h.

Carbonization of PFA/SBA-15 Composite

The dried PFA/SBA-15 composite is placed in a quartz boat, transferred to a tube furnace and carbonized in a flow of inert gas (argon 4.6, 40 mL/min) at 850° C. for 4 h with a heating rate of 1° C./min.

Removal of Hard Template

The carbonized composite is treated with a solution of hydrofluoric acid in order to remove the silica template. An amount of 1.00 g of sample is closed into a polypropylene container (100 mL) together with about 30 mL of 5% hydrofluoric acid. The slurry is stirred on a magnetic stirrer (400 rpm) at room temperature for 90 min. The resulting PFA/CMK-3 replica is then isolated on a fluted filter placed on a polypropylene funnel. The solid is washed with distilled water (50 mL) and ethyl alcohol (50 mL, 99.8%), and subsequently dried at 40° C. for 12 hours. Afterwards, the removal of the residual silica is repeated. Finally, the dried PFA/CMK-3 material is transferred to a polypropylene container and kept in a desiccator.

EXAMPLE 2

The textural and structural properties of the synthesized carbon replica were determined by means of low-temperature $N_2$ sorption and powder X-ray diffraction (XRD).

Figure 2:
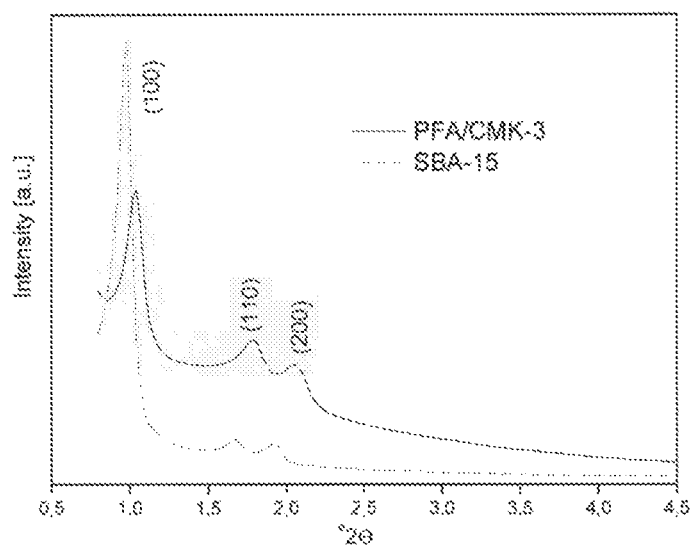

In FIG. 1 the isotherms of $N_2$ adsorption-desorption and pore size distribution profiles of the SBA-15 template and the PFA/CMK-3 carbon replica are shown, whereas the low-angle X-ray power diffraction patterns for these materials are displayed in FIG. 2.

The nitrogen adsorption-desorption isotherms recorded at −196° C. for the PFA/CMK-3 carbon replica (FIG. 1) is classified as the type IV isotherm, according to the IUPAC convention, which is assigned to mesoporous materials. The specific surface area calculated basing on the adsorption branch of isotherm following the Brunauer-Emmerr-Teller (BET) equation is equal to 1128 $m^2 g^{-1}$. The pore size distribution carve of PFA/CMK-3 (FIG. 1) determined using the BJH model shows a maximum at 3.3 nm, and its sharp shape clearly confirms obtaining the material with very uniform pore sizes. The low-angle XRD pattern (FIG. 2) recorded for PFA/CMK-3 material exhibiting three reflections (100), (110) and (200), strongly supports the formation of well-order, hexagonal mesostructure of CMK-3 carbon replica.

Both the isotherm with pore size distribution and the diffraction pattern confirm obtaining the well-ordered and homogenous material being the exact inverse structure of the pristine SBA-15 hard template.

EXAMPLE 3

The obtained material was tested for its potential application in the industrial, catalytic processes of hydrocarbon conversion. The dedicated reaction for the synthesized carbon replica was the process of the oxidative dehydrogenation of ethylbenzene to styrene. The catalytic runs were carried out in a flow-type quartz microreactor in the presence of oxygen as an oxidizing agent at the molar ratio ethylbenzene:$O_2$=1:1 (catalyst—0.5 g, total flow of reactants—50 mL/min, content of ethylbenzene vapor in helium—0.1% by volume). At such conditions and reaction temperature of 350° C., the conversion of ethylbenzene of 60.6% and the selectivity to styrene of 99.6% were observed. These results are very promising compared to those achieved over the commercial catalysts.

The invention claimed is:

1. The method of obtaining the CMK-3-type carbon replica, consisting of the introduction of SBA-15-type silica mesoporous sieve to a mixture of furfuryl alcohol and a solvent, the subsequent polycondensation of furfuryl alcohol, carbonization of the prepared composite and removal of hard template ($SIO_2$), wherein the reaction of furfuryl alcohol polycondensation is carried out by the precipitation method in a slurry containing SBA-15 silica sieve, water, furfuryl alcohol and concentrated solution of hydrochloric acid in mass ratios, respectively, in the range from 1.00:32.33:1.00:6.65 to 1.00:30.83:2.50:16.64, whereas the ratio of the total mass of furfuryl alcohol and water to the mass of SBA-15 as well as the mass ratio of the concentrated HCl solution to the mass of furfuryl alcohol are kept at the constant value for each synthesis.

2. The method according to claim 1, wherein said the polycondensation process is carried out at a temperature from the range of 30-100° C.

3. The method according to claim 1, wherein said polycondensation process is carried out for a time not less than 1 hour.

4. The method of obtaining the CMK-3-type carbon replica comprising:
   a) introducing SBA-15-type silica mesoporous sieve to a mixture of furfuryl alcohol and a solvent;
   b) subsequent to a) carrying out a reaction of furfuryl alcohol polycondensation by a precipitation method in a slurry containing SBA-15 silica sieve, water, furfuryl alcohol and concentrated solution of hydrochloric acid in mass ratios, respectively, in the range from 1.00:32.33:1.00:6.65 to 1.00:30.83:2.50:16.64, wherein the ratio of the total mass of furfuryl alcohol and water to the mass of SBA-15 as well as the mass ratio of the concentrated HCl solution to the mass of furfuryl alcohol are kept at a constant value for each synthesis;
c) carbonizing the prepared composite from b); and
d) removing a hard template ($SiO_2$) from the carbonized composite.

5. The method according to claim 4 including prior to c), isolating PFA/SBA-15 precipitate that resulted from b).

6. The method according to claim 4 including prior to a), drying the SBA-15-type silica mesoporous at 150° C. for 24 hours.

7. The method according to claim 4, wherein c) is performed in a flow of inert gas.

8. The method according to claim 4, wherein d) includes treating the carbonized composite with a solution of hydrofluoric acid.

9. The method according to claim 4, wherein the polycondensation process is carried out at a temperature from the range of 30-100° C.

10. The method according to claim 4, wherein the polycondensation process is carried out for a time not less than 1 hour.

11. The method according to claim 4, wherein a) includes stirring the obtained slurry of SBA-15-type silica mesoporous sieve and the furfuryl alcohol and solvent mixture at 400 rpm at room temperature for 30 minutes.

* * * * *